(12) United States Patent
Nedelka

(10) Patent No.: US 6,558,244 B1
(45) Date of Patent: May 6, 2003

(54) BAITFISH CHUNKING APPARATUS

(76) Inventor: John Nedelka, R. D. 2, Box 135, Frankford, DE (US) 19945

( * ) Notice: Subject to any disclaimer, the term of this patent is extended or adjusted under 35 U.S.C. 154(b) by 116 days.

(21) Appl. No.: 10/103,907

(22) Filed: Mar. 25, 2002

(51) Int. Cl.[7] ............................................. A22C 25/18
(52) U.S. Cl. ...................................................... 452/149
(58) Field of Search .................. 452/149, 152, 452/153, 155, 156, 160, 164; 30/114–117, 501, 503, 503.5, 301–305, 308, 314, 315, 340; 99/537, 538, 552, 553, 557, 558, 564, 565; 83/466.1, 394–396, 599, 609, 607

(56) References Cited

U.S. PATENT DOCUMENTS

| | | | |
|---|---|---|---|
| 273,176 A | * 2/1883 | Smith | |
| 608,368 A | * 8/1898 | Lawson | 269/53 |
| 843,427 A | * 2/1907 | Atkinson et al. | 241/89.1 |
| 1,183,472 A | * 5/1916 | Lewandowski | 30/304 |
| 2,114,277 A | * 4/1938 | Bloomfield | 209/400 |
| 2,405,385 A | * 8/1946 | Wingate | 30/355 |
| 2,836,212 A | * 5/1958 | Shaw | 29/446 |
| 3,180,194 A | * 4/1965 | Locke | 83/33 |
| 3,561,511 A | * 2/1971 | Kummer | 83/597 |
| 3,830,151 A | 8/1974 | Gerson | |
| 4,095,339 A | * 6/1978 | Turner | 30/114 |
| 4,095,518 A | 6/1978 | Jones | |
| 4,144,784 A | 3/1979 | Jones | |
| 4,253,650 A | 3/1981 | Kuzio | |
| 4,254,678 A | 3/1981 | Steiner et al. | |
| 4,383,365 A | * 5/1983 | Metzigian | 30/114 |
| 4,436,011 A | 3/1984 | Jones | |
| 4,625,364 A | 12/1986 | Adams | |
| 4,625,607 A | * 12/1986 | Maillez | 30/114 |
| 4,685,242 A | 8/1987 | Stanish | |
| 4,794,670 A | 1/1989 | Savastano, Jr. | |
| 4,959,921 A | 10/1990 | Stanish et al. | |
| 5,562,533 A | 10/1996 | Gallagher | |

* cited by examiner

*Primary Examiner*—Thomas Price
(74) *Attorney, Agent, or Firm*—Hall, Priddy, Myers & Vande Sande

(57) ABSTRACT

Apparatus for cutting baitfish employing a non-symmetrically arcuate biasing member for angularly articulating a baitfish against a plurality of blade surfaces. In certain embodiments, apparatus having an improved lever arm with increased mechanical advantage.

14 Claims, 7 Drawing Sheets

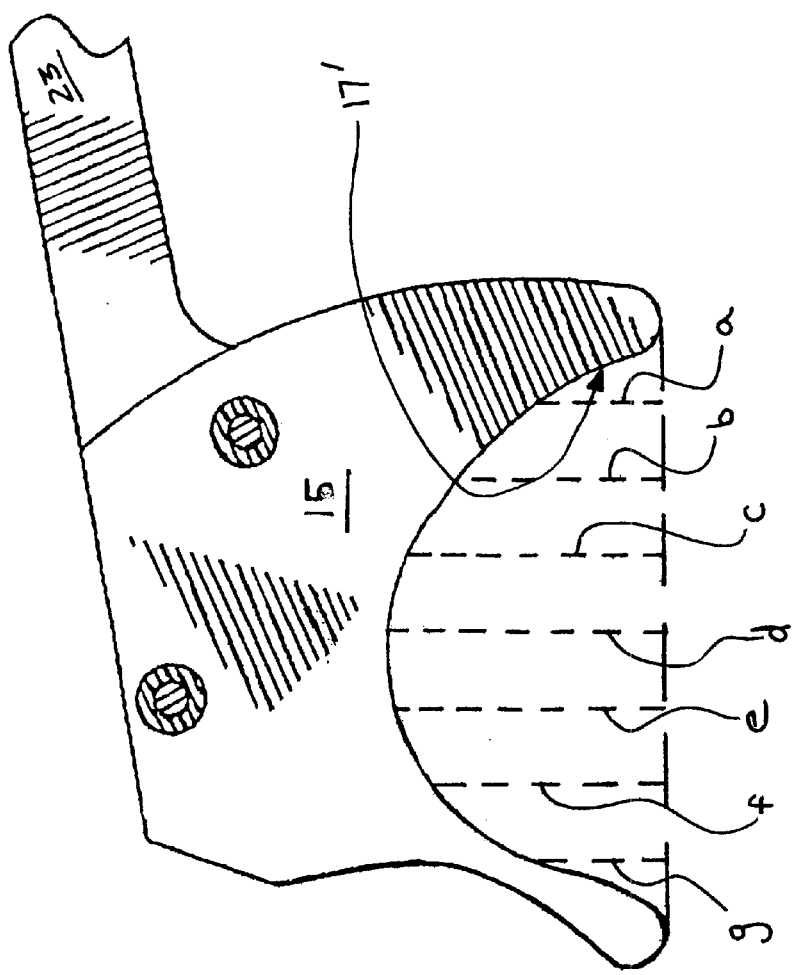

BAITFISH CHUNKING APPARATUS

FIELD OF INVENTION

This invention relates to apparatus for cutting baitfish employing a non-symmetrically arcuate biasing member for angularly articulating a baitfish against a plurality of blade surfaces. In addition, this invention relates to apparatus having an improved lever arm with increased mechanical advantage.

BACKGROUND OF INVENTION

Apparatus for the "chunking" of baitfish (i.e. the cutting of baitfish into ½ inch to 2½ inch chunks) such as butterfish, bunker, and mullet are known in the art and are exemplified by the apparatus described in U.S. Pat. No. 5,562,533. Such apparatus are typically employed because of their ability to slice fish into chunks at a much faster rate than with a simple knife. In addition, such devices add a measure of safety when chunking on a rocking boat for example.

Known chunking devices, such as the device described in the '533 patent, generally include a base portion having a series of blades and a press plate pivotally attached to the base portion for pushing a baitfish against the blades. This pushing action, when employed, forces the fish against and through the blades and thus cuts or "chunks" the baitfish into a predetermined number of pieces (i.e. chunks). These pieces, then, when on a fishing charter, for example, are thrown overboard in timed succession in order to attract larger predatory fish (e.g. tuna) to lures or baited hooks.

Although the device described in U.S. Pat. No. 5,562,533 is useful, certain deficiencies become apparent when the chunking device is employed in various typical chunking applications. For example, baitfish are often purchased frozen and increased effort is therefore required to operate the '533 device when chunking such frozen fish.

Conversely, once bait fish have thawed, another problem arises due to the unique composition of fish bodies. Because fish have a tough outer skin with scales and relatively soft fleshy bodies, the body of the fish, when thawed, becomes difficult to cut cleanly without crushing the fish's body under the compression pressure of the blades and the press plate. If crushed, the fish "chunks" are more difficult and messy to handle and are even thought to be less attractive to some types of game or sport fish.

In view of the foregoing, it is apparent that there exists a need in the art for chunking apparatus which overcomes, mitigates, or solves the above problems in the art. More particularly, it is apparent that there exists a need for chunking apparatus which has increased mechanical efficiency for cutting hard frozen fish and which is capable of cutting thawed baitfish without crushing the fish bodies. It is a purpose of this invention to fulfill this and other needs in the art which will become more apparent to the skilled artisan once given the following disclosure.

SUMMARY OF INVENTION

Generally speaking, this invention solves the above-described problems in the art by providing: a chunking apparatus comprising:
 a base member comprising a frame which defines a cavity;
 a plurality of spaced apart blades attached proximal the base member and spanning at least a portion of a length of the cavity;
 a lever arm pivotally attached proximal the base member; and
 a biasing means attached to the lever arm for angularly articulating a fish against the plurality of spaced apart blades.

In another embodiment there is provided: a chunking apparatus comprising:
 a base member comprising a frame which defines a cavity;
 a plurality of spaced apart blades attached proximal the base member and spanning at least a portion of a length of the cavity;
 a lever arm pivotally attached proximal the base member;
 a biasing member so shaped and located and attached to the lever arm such that when a fish is placed on the spaced apart blades, and the lever arm is operated, the biasing member biases the fish angularly against the plurality of spaced apart blades.

IN THE DRAWINGS

FIG. 8 is a diagrammatic side-view of the angularly articulating biasing member according to one embodiment of the subject invention.

DETAILED DESCRIPTION OF CERTAIN EMBODIMENTS

Figure 1:
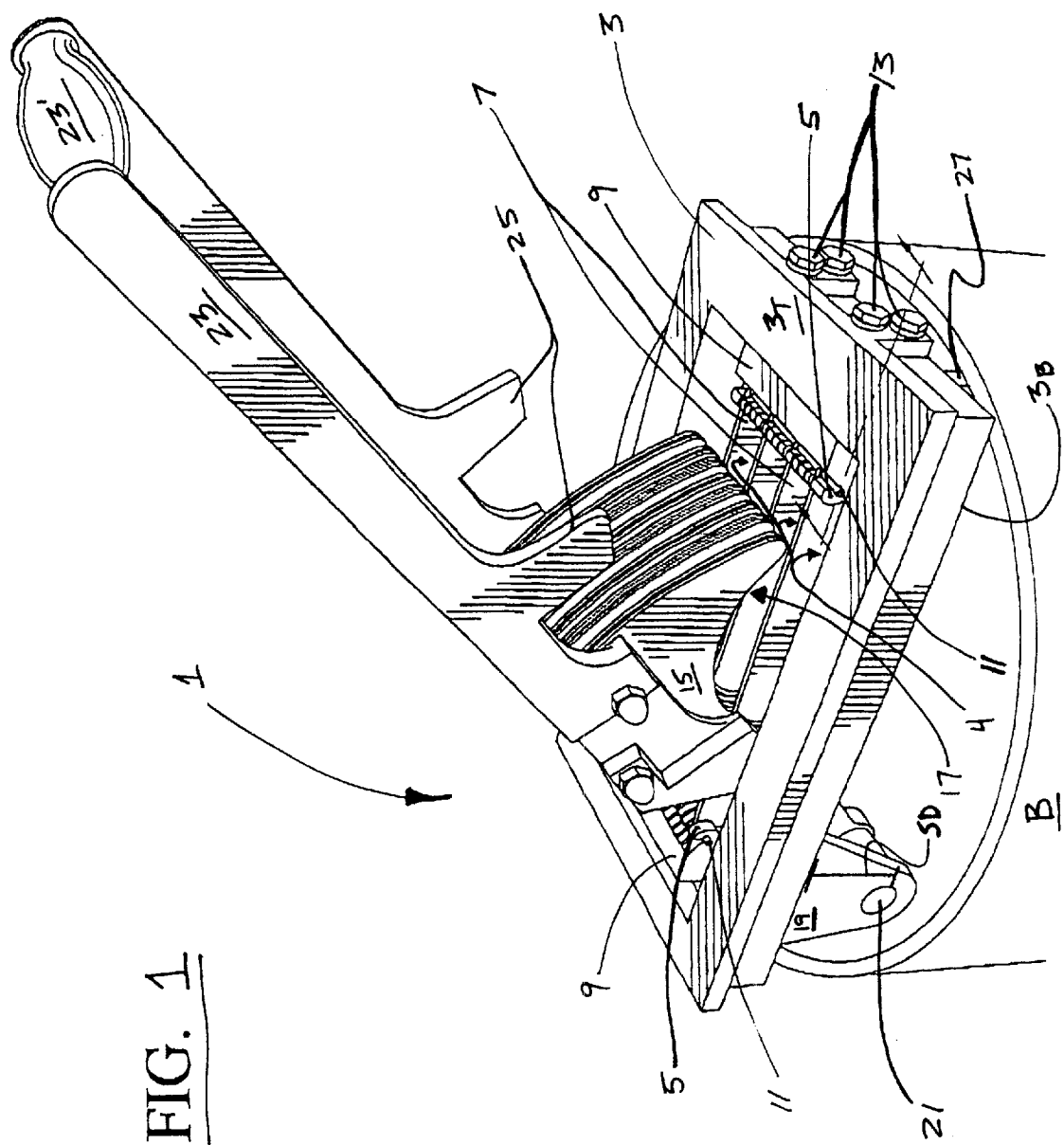
FIG. 1 is a three-dimensional view of one embodiment of the chunking apparatus according to the subject invention.

Referring initially to FIG. 1, therein is illustrated one exemplary embodiment of the chunking apparatus according to the subject invention. As illustrated, chunking apparatus 1 comprises a base member 3 which frames a cavity 4. Within cavity 4, a plurality of blades 7 are spaced therein, mounted at each of their ends between two mount blocks 9. As may be seen more clearly in FIGS. 2–3, each mount block 9 includes a pair of pins seats 5 in which locking pins 11 are seated to secure blades 7 at their ends to the respective mount blocks (through pin apertures in the blades not shown). Mount blocks 9, in turn, are secured to base member 3 in conventional fashion employing bolts 13 on either side of the base member.

Figure 2:
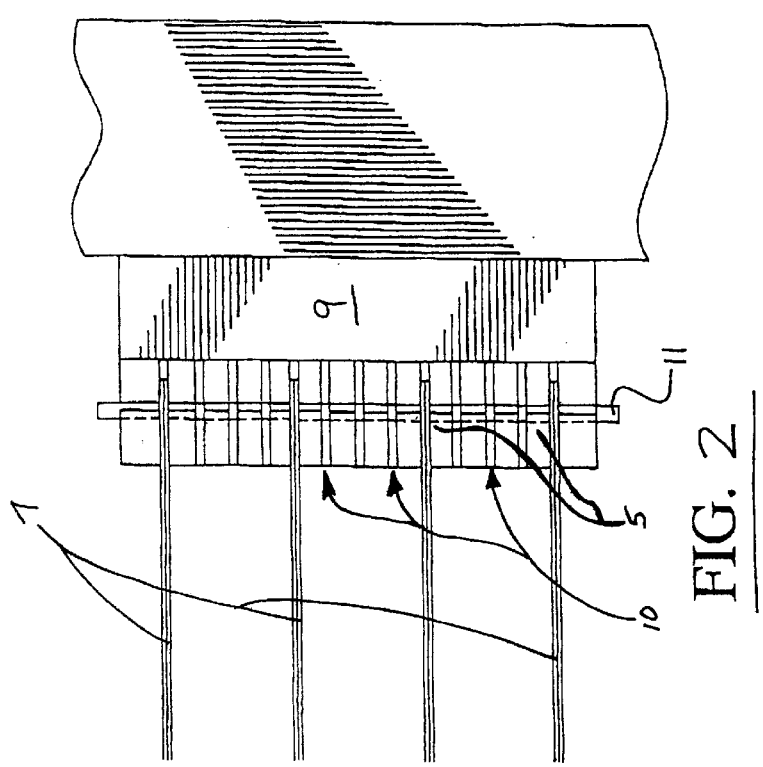
FIG. 2 is a sectional top-view of the adjustable blade mounting mechanism according to one embodiment of the subject invention.
Figure 3:
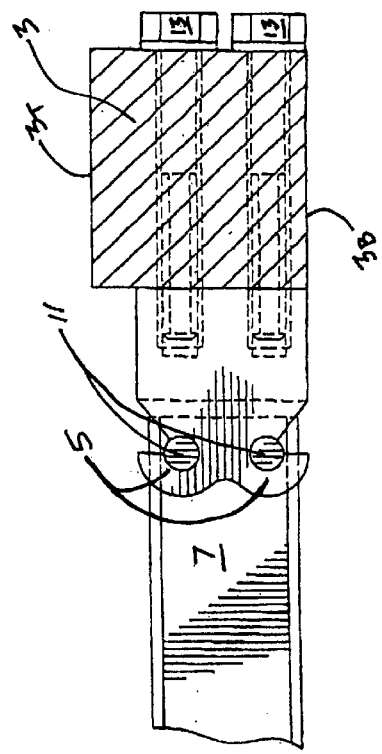
FIG. 3 is a side-sectional, partial x-ray view of the adjustable blade mounting mechanism illustrated in FIG. 2.
Figure 4:
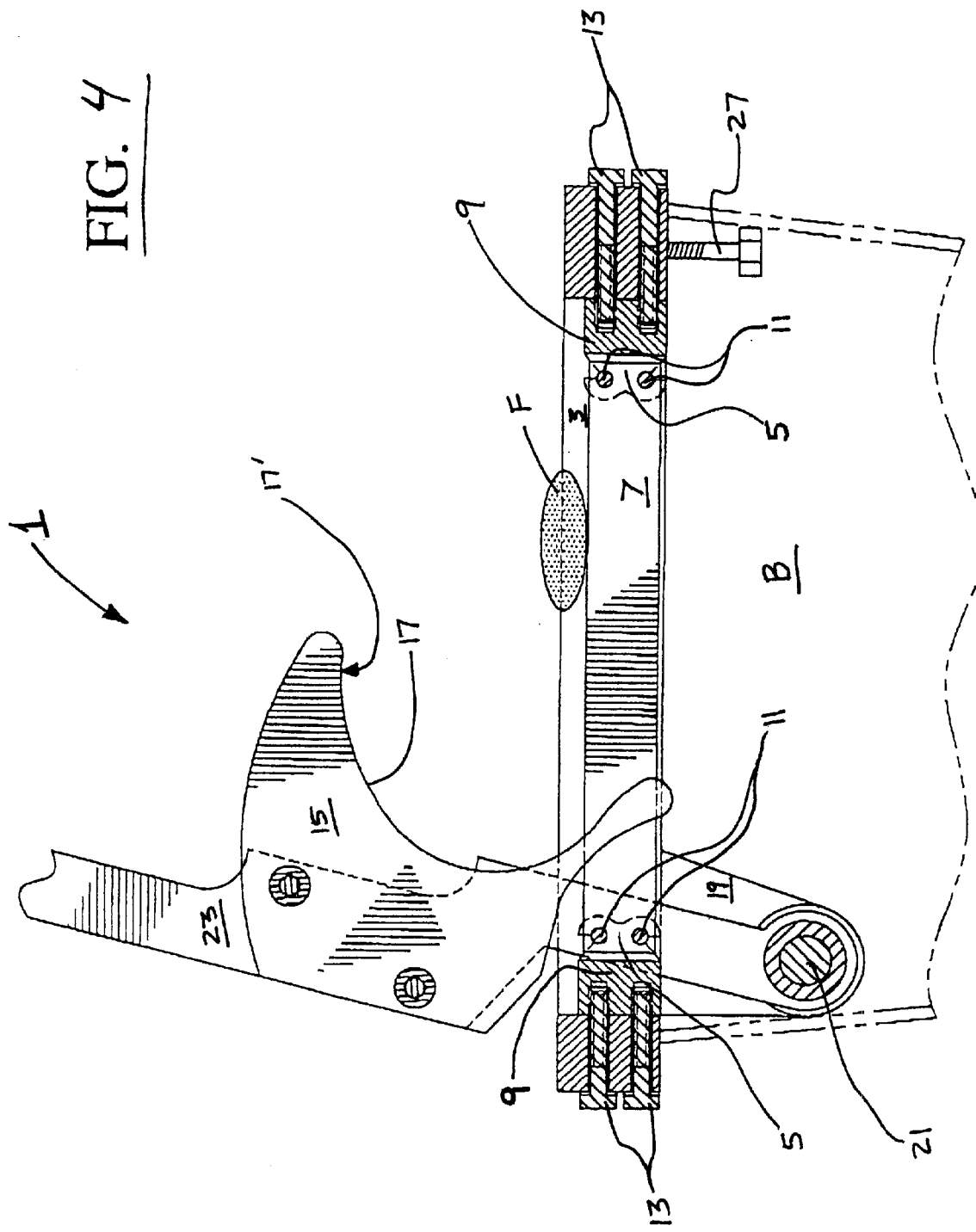
FIG. 4 is a sequential, side-sectional, partial x-ray view of the embodiment illustrated in FIG. 1 shown with a baitfish in place at the beginning of a chunking operation.
Figure 5:
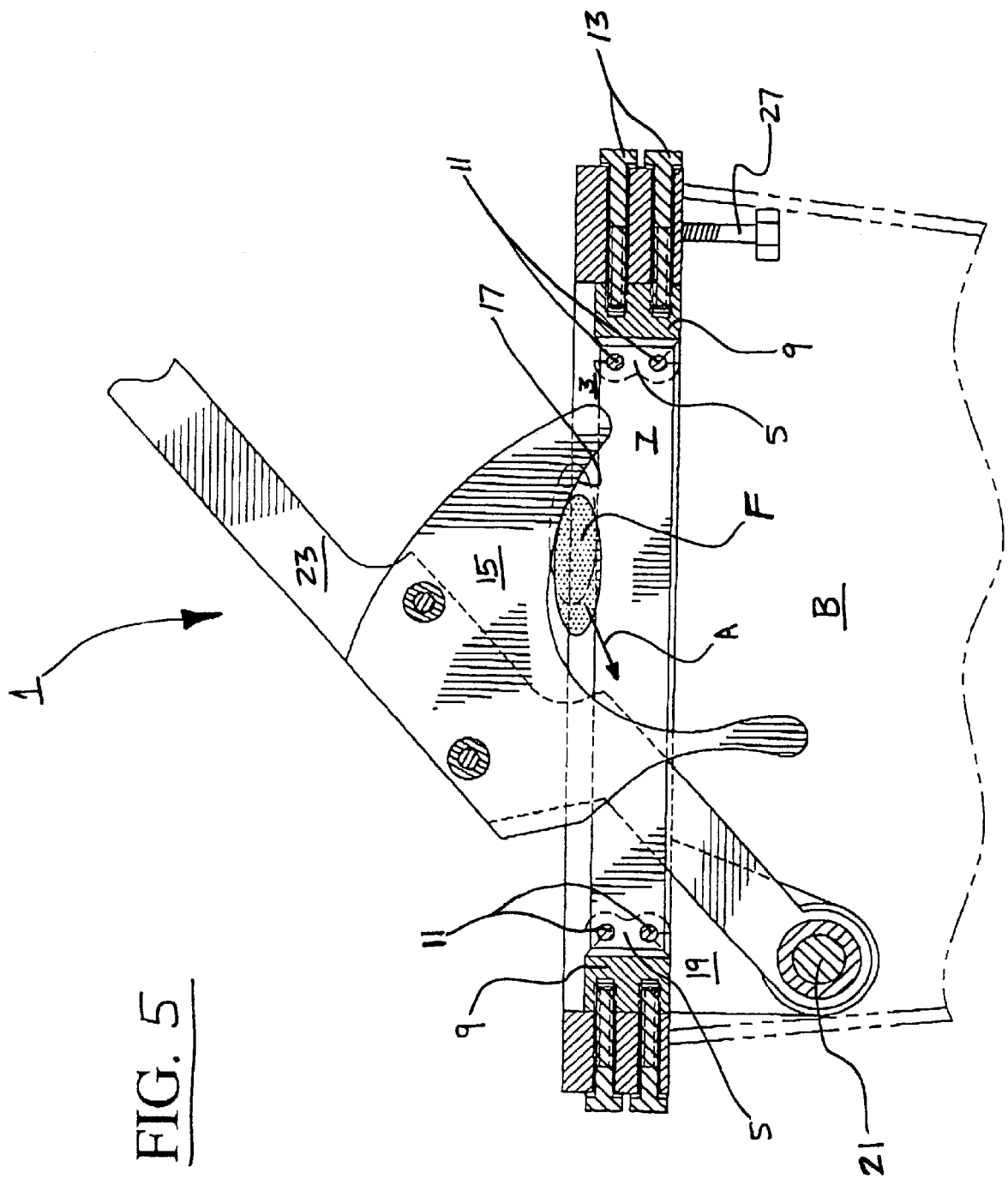
FIG. 5 is a sequential, side-sectional, partial x-ray view of the embodiment illustrated in FIG. 4 shown in an intermediate step of a baitfish chunking operation.
Figure 6:
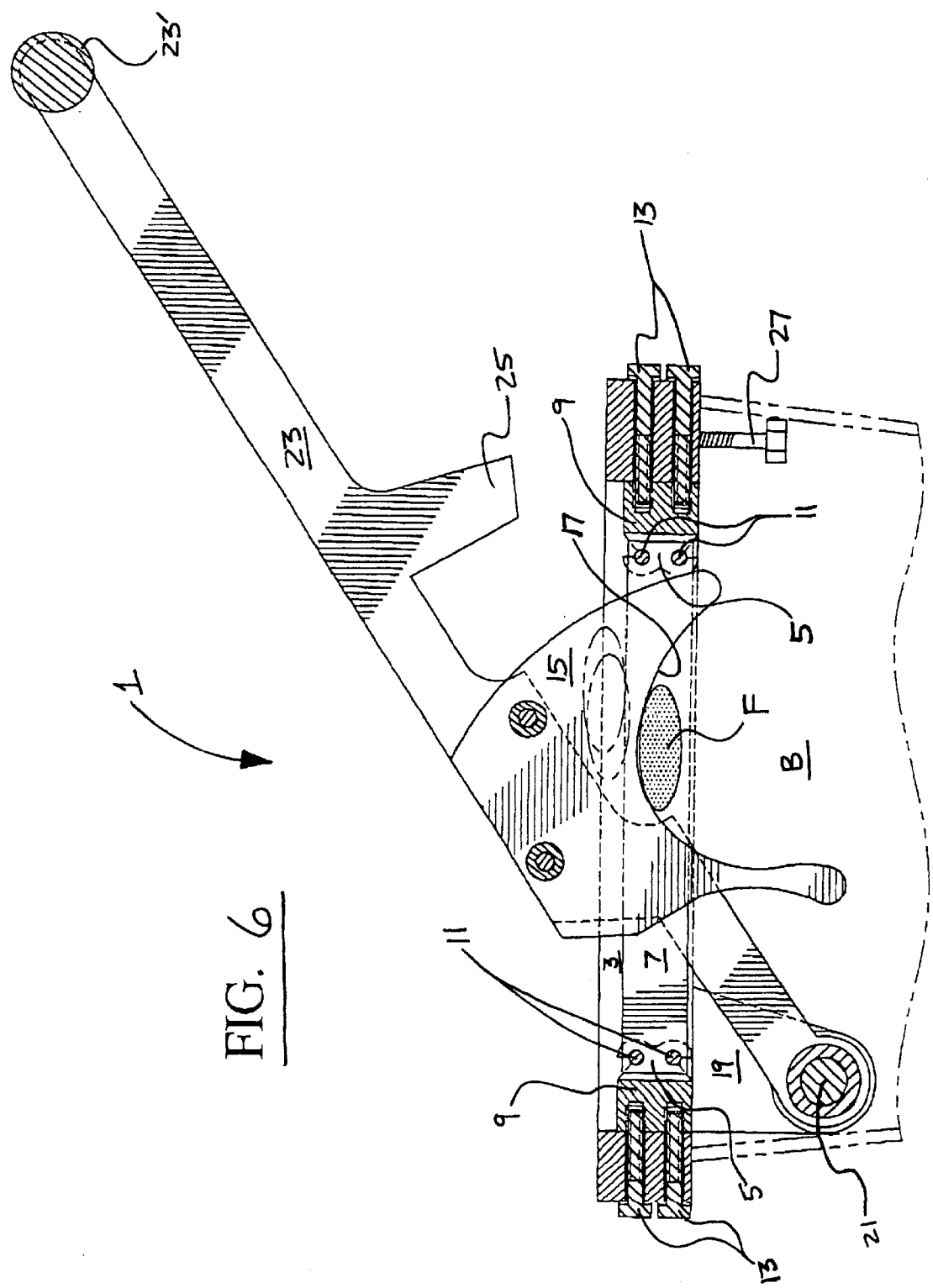
FIG. 6 is a sequential, side-sectional, partial x-ray view of the embodiment illustrated in FIG. 5 shown in a further intermediate step of a baitfish chunking operation.
Figure 7:
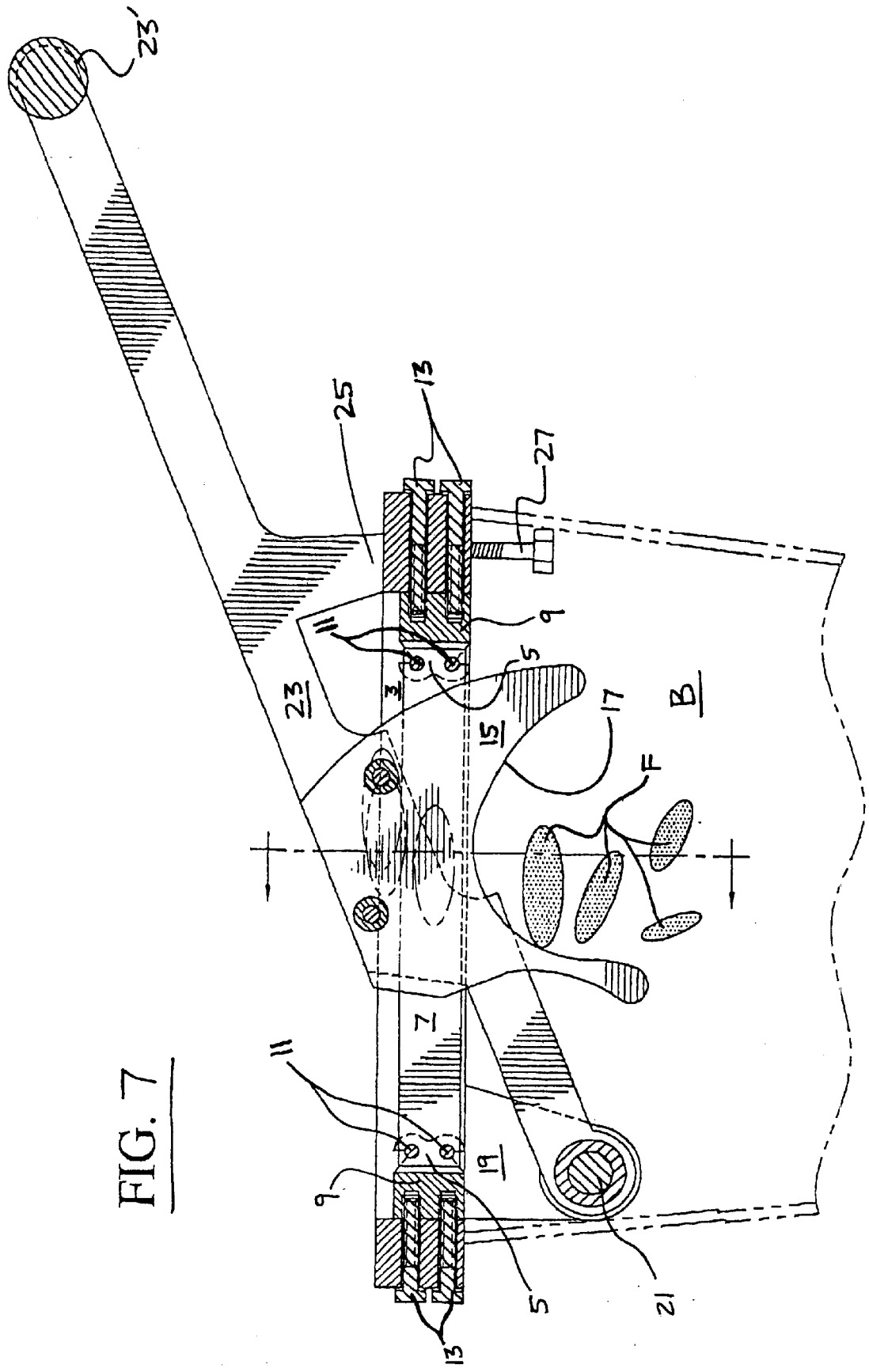
FIG. 7 is a sequential, side-sectional, partial x-ray view of the embodiment illustrated in FIG. 6 shown in the final step of a baitfish chunking operation.

In certain embodiments, and as illustrated in FIG. 2, the distance between blades 7 may be varied to produce different chunk sizes as desired. As may be seen in this figure, a plurality (an exemplar number being 13) of blade slots 10 are provided in mount blocks 9 for the seating of blades 7 therein. Given that relatively large chunks are typically desired (and thus corresponding minimum blade spacings required), 3–5 blades spaced from ½ inch to 2½ inches apart are most often employed, these spacings, of course, producing chunks of similar widths. Employing unique mount blocks 9, then, in combination with removable blades 7, chunking apparatus 1 is capable of producing these chunk sizes, as well as other sizes as desired, by the simple adjustment of the spacing of the blades (or by removal or addition of blades). This is achieved by removing locking pins 11 and then inserting the preferred number of blades 7 at the desired spacings in slots 10 and thereafter reinserting pins 11.

Referring now again to FIG. 1, chunking apparatus 1 further comprises a unique biasing member 15 which is provided as the mechanism by which fish "F" (see FIGS. 4–7) are pressed through the arrangement of spaced blades 7. For this purpose, biasing member 15 is mounted to lever 23 in conventional fashion (e.g. via welds or with bolts as illustrated), and lever 23, in turn, is pivotally mounted a spaced distance from the undersurface (i.e. bottom surface) 3B of base member 3. More specifically, in the embodiment illustrated in FIG. 1, mount means comprising a pair of mount plates 19 are provided as a mechanism for pivotally mounting lever 23, via pivot 21, at a spaced distance "SD" from the undersurface 3B of base member 3. Although various spaced distances may be employed, or no spaced distance employed at all, an exemplary distance for locating pivot 21 is approximately 1.5–3.5 inches. Mounted as such, lever arm 23 extends upwards through cavity 4 whereby handle 23' may be employed to apply an articulating force against the body of a fish to be cut. Uniquely, by specifically locating pivot 21 at a spaced distance from the bottom surface 3B of base member 3, the lever which is obtained is effectively longer (as compared to a lever pivotally mounted directly to the base member itself) while still retaining the relative compact nature of the chunking apparatus (i.e. by concealing a portion of the lever arm below the chunking apparatus). This location of pivot 21, then, provides chunking apparatus 1 with increased mechanical advantage, and operation thereof thus requires less effort than prior art devices employing conventionally mounted lever arms particularly when cutting i.e. "chunking" frozen fish.

As aforesaid, and referring now to FIGS. 4–7, biasing member 15 may be operated, via lever 23, to apply a force to the body of a fish "F" sufficient such that the fish is forced through blades 7 and thus cut into desirably sized "chunks". It is noted, in this regard, that biasing surface 17 of biasing member 15 is unique in that it is non-symmetrically arcuately shaped i.e. the leading surface 17' of biasing surface 17 is straighter or less arcuate than the remainder of the biasing surface as you trace its length. A side-plan view of this inventive shape is illustrated in FIG. 8 and, as such, as you trace through distances a–g, and, in particular, compare distances a–c with e–g, the less arcuate nature of the leading edge 17' of biasing surface 17 may be clearly seen. Other similar shapes which are capable of angularly articulating a fish against blades 7 may, of course, be employed.

In operation, therefore, and as may be seen in sequential FIGS. 4–7, when lever 23 is operated and surface 17 is brought into contact with fish "F", leading surface 17' articulates fish "F" simultaneously in a downward and horizontal direction. It is this angular articulation (indicated by arrow A in FIG. 5) which enables the improved ability to cut thawed baitfish without otherwise crushing the fish bodies with direct compression forces as with prior art devices. In particular, the horizontal component of the angular articulation which occurs, slides fish "F" against the cutting surface of blades 7 and thus scores or slices the skin of the fish prior to the full force of the more direct compression forces being applied (such horizontal articulation of fish "F" being illustrated by the dotted lines in FIGS. 5–7). Once the skin has been scored or sliced, blades 7 are able to pass more easily through the body of the fish, and the downward component of the angular articulation then forces fish "F" through the remainder of the distance through blades 7 (see FIG. 7) with less damage to the integrity of the fish body than which is obtainable with prior art devices. Optional lever stops 25, then, contact top surface $3_T$ of base member 3 and prevent any further pivoting of lever 23.

In certain embodiments when operating chunking apparatus 1, it is often convenient to place the apparatus on top of a container (e.g. bucket "B") so that as fish are "chunked", the pieces fall within the confines of the container. Aiding in this purpose, therefore, and referring again now to FIGS. 1–7, legs 27 are provided and, as such, are adjustable such that they abut against an interior surface of bucket "B" for apparatus stability. Mount means 19, in addition to its other functions, serves a similar purpose as legs 27, in this regard, by abutting against the opposite side of the bucket interior. Therefore, with legs 27 properly adjusted, and with both legs 27 and mount means 19 abutting the interior of bucket "B" (or other bucket), chunking apparatus 1 is effectively stabilized for ease of operation.

I claim:

1. A chunking apparatus comprising:

a base member comprising a frame which defines a cavity;

a plurality of spaced apart blades forming a substantially planar cutting surface adapted to receive a fish thereon, said plurality of spaced apart blades attached proximal said base member and spanning at least a portion of a length of said cavity;

a lever arm pivotally attached proximal said base member; and a biasing means attached to said lever arm and so shaped as for capturing a fish against said plurality of spaced apart blades and thereafter angularly articulating a fish against said plurality of spaced apart blades.

2. The chunking apparatus according to claim 1 wherein said biasing means comprises a non-symmetrically arcuately shaped biasing surface.

3. The chunking apparatus according to claim 2 wherein said non-symmetrically arcuately shaped biasing surface is so shaped such that when said biasing means is pressed against a body of a fish employing said lever arm, said non-symmetrically arcuately shaped biasing surface causes the fish to be articulated a distance horizontally along the length of said spaced apart blades.

4. The chunking apparatus according to claim 3 wherein said non-symmetrically arcuately shaped biasing surface is so shaped such that when said biasing means is pressed against the body of the fish employing said lever arm, said non-symmetrically arcuately shaped biasing surface causes the fish to be articulated downwardly and simultaneously horizontally a distance along the length of said spaced apart blades.

5. The chunking apparatus according to claim 4 wherein said base member has top and bottom surfaces and further including mount means attached proximal said bottom surface of said base member and extending a first distance downward therefrom; and wherein said lever arm is a rigid longitudinal member having a single pivot attached to said mount means and wherein said lever arm extends from said mount means through the plane of said cavity defined by said frame to a position located a second distance upward from said top surface of said base member.

6. The chunking apparatus according to claim 5 wherein said first distance is selected from between 1.5–3.5 inches.

7. The chunking apparatus according to claim 5 further including at least one foot member having an adjustable position and located proximal said bottom surface of said base member for abutting a first interior surface of a container, and wherein said mount means is so located so as to abut a second interior surface of the container when said chunking apparatus is mounted on the container.

8. In combination, a bucket and a chunking apparatus according to claim 5 mounted on said bucket.

9. The chunking apparatus according to claim 1 further including a first and a second blade mounting block mounted at a first and a second end of said cavity respectively, wherein each said blade mounting block comprises:

- a plurality of spaced apart blade slots for seating of said spaced apart blades therewithin;
- at least one pin seat; and
- at least one pin for seating in said pin seat for connecting said spaced apart blades to one of said mounting blocks.

10. The chunking apparatus according to claim 9 further including at least a second pin seat and pin for connecting said spaced apart blades to one of said mounting blocks and for providing torsional stability to said spaced apart blades.

11. The chunking apparatus according to claim 9 wherein the spacing of said spaced apart blades is selectable.

12. A chunking apparatus comprising:

- a base member comprising a frame which defines a cavity;
- a plurality of spaced apart blades forming a substantially planar cutting surface adapted to receive a fish thereon, said plurality of spaced apart blades attached proximal said base member and spanning at least a portion of a length of said cavity;
- a lever arm pivotally attached proximal said base member;
- a biasing member so shaped and located and attached to said lever arm such that when a fish is placed on said spaced apart blades, and said lever arm is operated, said biasing member captures the fish against said plurality of spaced apart blades and thereafter said biasing member biases the fish angularly against said plurality of spaced apart blades.

13. The chunking apparatus according to claim 12 wherein said base member has top and bottom surfaces and further including mount means attached proximal said bottom surface of said base member and extending a first distance downward therefrom; and wherein said lever arm is pivotally attached to said mount means and extends from said mount means through the plane of said cavity defined by said frame to a position located a second distance upward from said top surface of said base member.

14. The chunking apparatus according to claim 13 wherein said first distance is selected from between 1.5–3.5 inches.

* * * * *